United States Patent [19]

Dvorin

[11] 4,315,381
[45] Feb. 16, 1982

[54] AUTOMATIC HYDROPONIC GARDEN

[76] Inventor: Stuart R. Dvorin, 742 Appleberry Dr., San Rafael, Calif. 94903

[21] Appl. No.: 114,989

[22] Filed: Jan. 24, 1980

[51] Int. Cl.³ .............................................. A01G 31/02
[52] U.S. Cl. ............................................. 47/59; 47/64
[58] Field of Search ....................................... 47/58–65, 47/79, 80; 119/5; 417/108; 210/220; 261/DIG. 70, 28, 30

[56] References Cited

U.S. PATENT DOCUMENTS

| | | | |
|---|---|---|---|
| 2,198,150 | 4/1940 | Barnhart | 47/62 |
| 2,306,027 | 12/1942 | Swaney | 47/79 |
| 2,486,512 | 11/1949 | Armstrong | 47/62 |
| 2,730,496 | 1/1956 | Zavod | 119/5 X |
| 2,782,161 | 2/1957 | Willinger et al. | 210/220 X |
| 3,247,826 | 4/1966 | Girard | 119/5 |
| 3,550,319 | 12/1970 | Gaines | 47/79 |
| 3,900,004 | 8/1975 | Goldman et al. | 119/5 X |
| 4,016,677 | 4/1977 | Julinot | 47/80 |
| 4,037,363 | 7/1977 | Baumann | 47/59 |
| 4,211,034 | 7/1980 | Piesner | 47/59 X |

*Primary Examiner*—James R. Feyrer
*Attorney, Agent, or Firm*—Willis E. Higgins

[57] ABSTRACT

An automatic hydroponic garden includes a single container for water and growing medium immersed in the water. A means is provided in the container for constantly mixing the water and air and circulating the mixture within the container. An enclosure surrounds the mixing means, into which plant nutrient may be added to the water and which disperses the air-water mixture in the container. A means for supplying air is connected to the mixing means. The result is an improved hydroponic gardening method in which plant roots are immersed in the water, which is both constantly aerated and circulated in a manner that does not agitate the plant roots.

9 Claims, 2 Drawing Figures

AUTOMATIC HYDROPONIC GARDEN

BACKGROUND OF THE INVENTION

1. Field of the Invention

This invention relates to an improved automatic hydroponic garden. More particularly, it relates to such a hydroponic garden in which required maintenance is minimized and trouble-free results may be obtained. It also relates to an improved hydroponic gardening method which may be practiced by the apparatus of this invention.

2. Description of the Prior Art

The art or science of hydroponics is, of course, well known and developed. The term hydroponics refers to the use of aqueous solutions containing nutrients and the absence of soil in the growing of plants. Some form of a growing medium or inert support, such as rocks or synthetic materials, are commonly used for supporting the plants. However, unlike traditional horticulture involving the use of soil, the sole source of nutrients for the plants is the aqueous solution.

As typically practiced, hydroponics is a labor intensive operation. The aqueous nutrient solutions must be drained into a reservoir periodically, often several times a day. As a result, the use of hydroponics has hitherto been largely restricted to commercial scale greenhouses, horticulture laboratories, and similar environments where relatively large amounts of time may be dedicated to caring for the plants and maintenance of the hydroponic equipment.

Various attempts have been made in the past to provide smaller hydroponic units for home use. These usually involve dripping the nutrient solution from a reservoir through the growing medium. However, it is difficult to achieve a constant environment for the plant roots with such a system. Further, to the extent that smaller scale units have been modeled on larger scale, commercial hydroponic units, they have been both too expensive and too demanding of attention to have achieved success in the market place.

More recently, it has been proposed to use aquarium air stones to aerate a nutrient solution in a single container below the main body of plant roots. However, such an approach tends to subject the roots themselves to agitation, which impedes plant growth.

Thus, despite the fact that a hydroponic garden of a given size will yield as much as a conventional soil garden eight times its size, since nutrients are delivered directly to the roots, and extensive root systems are therefore not developed by the plants in a struggle to find nutrients and moisture, a need has hitherto remained for further development of small scale, automatic hydroponic units suitable for home use.

SUMMARY OF THE INVENTION

Accordingly, it is an object of this invention to provide an automatic hydroponic garden with an improved combination of elements which gives better operation in practice.

It is another object of this invention to provide a hydroponic garden in which fluid flows are arranged to prevent dead spots in which the water solution is not rejuvenated, without agitating the plant roots.

It is another object of the invention to provide a hydroponic garden in which nutrients may be easily added without endangering the plants growing in the garden due to localized high concentrations of the nutrient.

It is a still further object of the invention to provide an automatic hydroponic garden in which the plant roots are maintained in an optimum and constant environment immersed in a nutrient solution.

It is yet another object of the invention to provide an automatic hydroponic garden in which a constantly aerated nutrient solution is provided and circulated around the plant roots at all times in a manner that will not disturb or agitate the roots.

It is a still further object of the invention to provide a hydroponic gardening system in which plants grow faster than in conventional soil gardens and prior art hydroponic systems.

The attainment of these and related objects may be achieved through use of the novel automatic hydroponic garden herein disclosed. The garden includes a container for water and growing medium. A mixture chamber for air and water is provided in the container, but separate from roots of a plant grown in the container. The chamber has a water inlet proximate to the bottom of the chamber, an air inlet and an outlet for the air and water in admixture proximate to the top of the chamber. A water inlet tube is connected to the water inlet of the chamber. It extends along the bottom of the container and has a plurality of apertures into which water may flow. An air pump or other means for supplying air to the air inlet of the mixing chamber is provided.

The automatic hydroponic garden of this invention preferably also includes an air-water mixture dispersing enclosure surrounding the mixing chamber. The enclosure has a plurality of apertures through which the water and air mixture from the mixing chamber may be dispersed into the water and growing medium container. The dispersing enclosure may optionally also include growing medium to prevent undissolved plant nutrient added to the enclosure from entering the growing medium container and producing localized hot spots of high concentration of the plant nutrient, which could damage the plants in the garden.

Through use of these elements, the water solution may be constantly circulated and rejuvenated through mixing with air, without agitating or disturbing the plant roots. Providing such an arrangement for recirculating and aerating the aqueous solution of growing medium and arranging the elements so that localized dead spots of the solution do not occur in the container means that the plants are constantly immersed in an aerated, aqueous circulating nutrient solution, without disturbing or agitating the plant roots. This constancy provides them a more stable growing environment than one in which their root hairs are being frequently disturbed and torn due to the prior art approaches of periodically flushing and draining the aqueous solution from the growing area, or aerating around the roots.

The attainment of the foregoing and related objects, advantages and features of the invention should be more readily apparent to those skilled in the art, after review of the following more detailed description of the invention, taken together with the drawings in which:

DETAILED DESCRIPTION OF THE INVENTION

Figure 1:
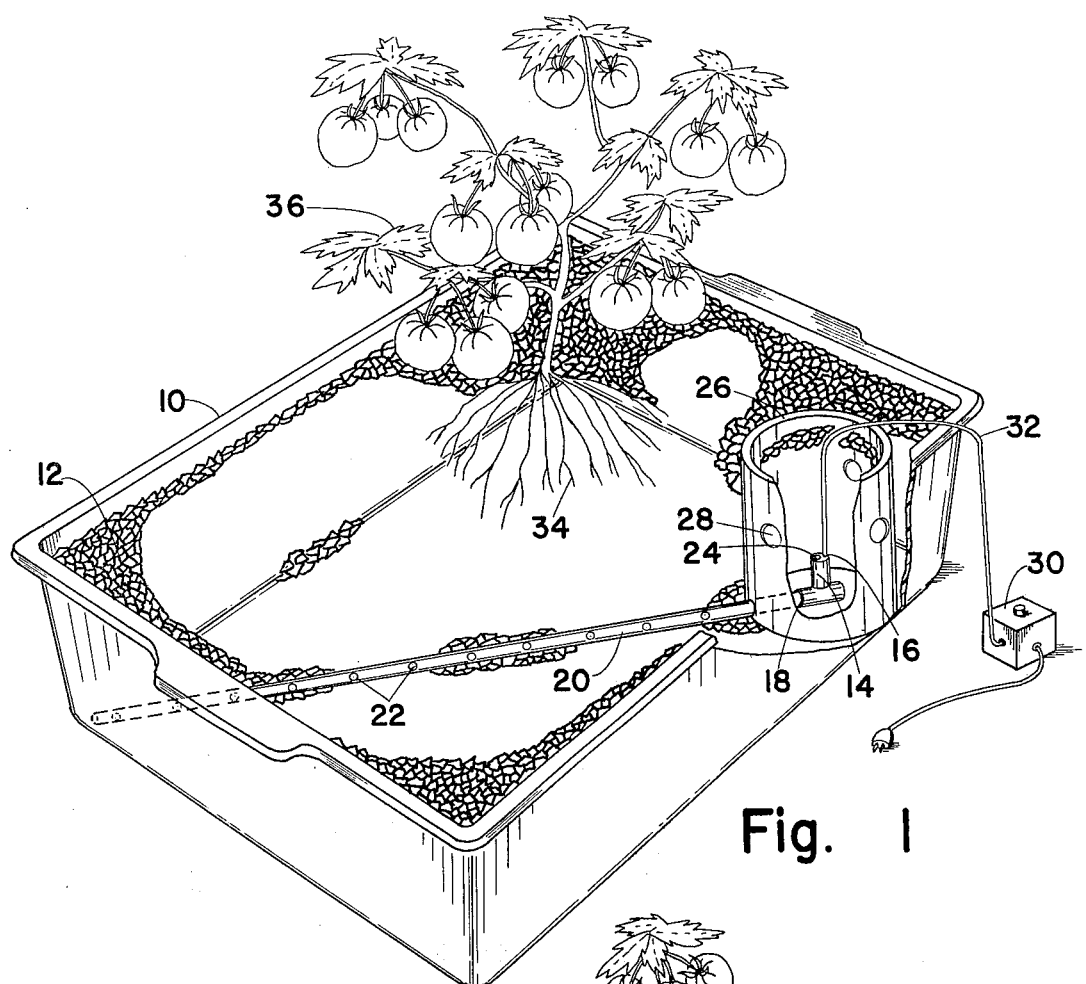
FIG. 1 is a perspective view of an automatic hydroponic garden in accordance with the invention.

Turning now to the drawings, there is shown a container 10 which is preferably formed of a molded high impact plastic. While the container may be any container of the general shape shown, a particularly suitable example is a commercially available plastic container employed for dishes in restaurants. The container 10 is filled near to its top with a suitable growing medium, such as crushed, irregularly shaped, porous rock indicated at 12. This is preferably a lava type of rock, which has many small apertures into which air bubbles may be trapped, does not absorb nutrients, is easily re-usable, and can be rinsed without damaging root hairs.

An air and water mixing chamber 14, generally cylindrical in shape, is provided in the container. The mixing chamber 14 has an air inlet 16 and a water inlet 18. A water inlet tube 20 extends along the bottom of the container and has apertures 22 extending along its length, through which water may enter through tube 20 for delivery to the mixing chamber 14. An air and water mixture outlet 24 is provided at the top of the mixing chamber 14. A nutrient dissolving and air-water mixture dispersing enclosure 26 surrounds the mixing chamber 14. The enclosure 26 has four apertures 28 below the water line spaced equally around its circumference. The dissolving and dispersing container 26 also preferably contains the crushed lava rock 12, as well. A simple air pump 30, of the type commonly employed with aquariums, is connected to the inlet 16 of the mixing chamber 14 by air tube 32.

In operation, air enters the mixing tube 14 through air inlet 16 and moves upward toward air-water outlet 24. As the air bubbles move upward they push water through the outlet 24 ahead of them and they are mixed with the water. As a result, water enters the tube 20 and moves into the chamber 14 through water inlet 18. The sequence is then repeated in the mixing chamber 14.

Figure 2:
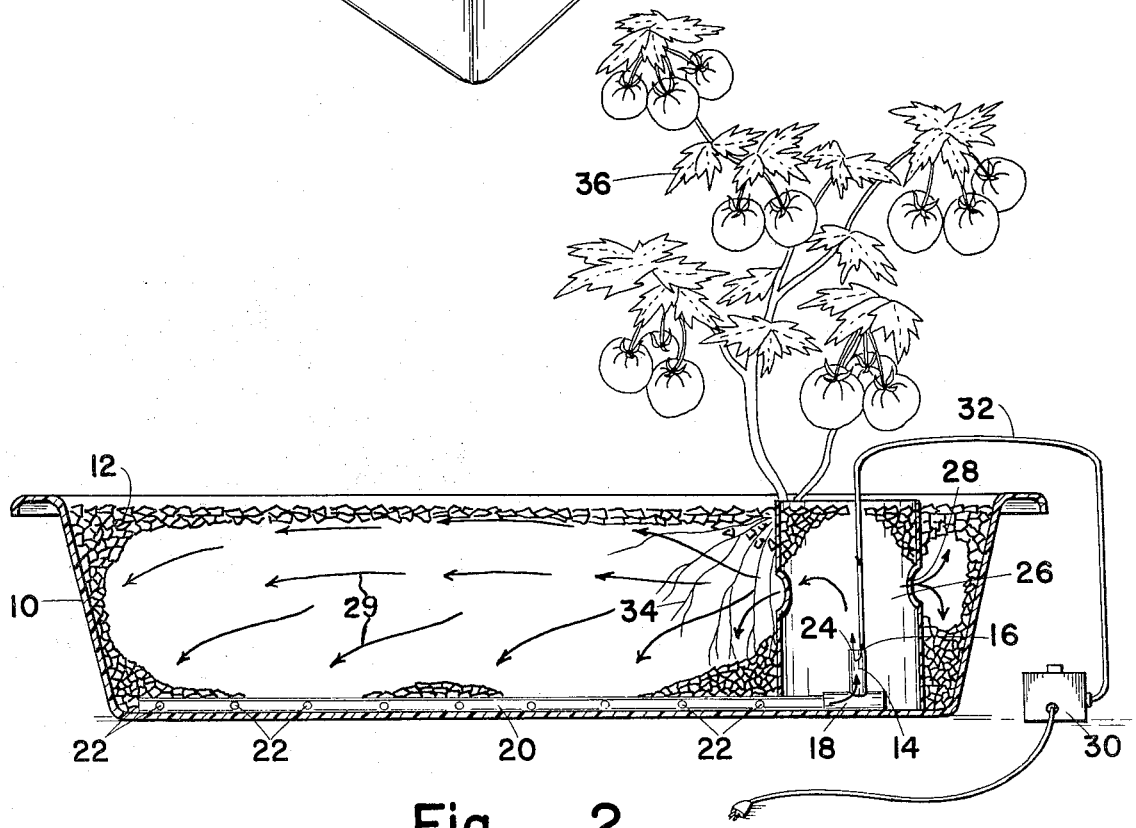
FIG. 2 is a cross section view of the automatic hydroponic garden of FIG. 1.

When the air-water mixture emerges from the outlet 24 it moves within the enclosure 26 toward openings 28 and out to the remainder of the container 10. With four apertures 28 around the enclosure 26, sufficient movement of water in all areas of the container 10 occurs so that no dead spots of unaerated water remain in the container 10. The result is constant aeration of the water in a manner that does not agitate the plant roots and gentle circulation of the aerated water to all parts of the container, as shown by arrows 29 in FIG. 2.

If plant nutrient is added to the enclosure 26, the presence of lava rock 12 inside the enclosure 26 serves to prevent the movement of undissolved nutrient granules into the body of container 10, where they might lodge near the roots 34 of a plant 36 growing in the container 10. Should that occur, localized fertilizer burning of the roots 34 and consequent damage to a plant 36 would occur. It should be recognized that the garden shown may contain from four to six plants 36 in typical use.

With the above arrangement, the water level may extend up to the surface of the rock 12. However, if it extends above the surface of the rock, algae or other undesirable growth may occur in the water, tending to impede operation of the system. As evaporation occurs, additional water is added to keep the water level just below the surface of the rock.

In practice, the automatic hydroponic garden of this invention allows a water-nutrient solution to be used for four weeks under most conditions, with the addition of more nutrient after two weeks. The pH of water-nutrient solution should be maintained at about 6.6 to 7.2. If the solution is too alkaline, sodium biphosphate may be added to lower the pH. If the solution is too acidic, a small amount of sodium bicarbonate may be added to raise the pH. After four weeks, it is necessary to change the water solution due to build up of spent nutrient and waste material in it. This is easily accomplished by placing the end of a garden hose in the enclosure 26 and employing a conventional water bed drain on the other end of the garden hose to initiate suction, thus removing the nutrient solution from the enclosure 26. The addition of more water to the container 10 during the suction removal will aid in washing out spent nutrient. Alternatively, a simple siphon can be placed in the enclosure 26 and the other end of the container 10 elevated for rinsing toward the chamber 26. The rinsing should be carried out in a gentle fashion to minimize disturbance of the plant roots.

The automatic hydroponic garden of this invention can be employed outdoors or indoors. If it is used indoors, it is preferred to employ conventional growing lights to promote rapid growth of the plants. The garden may be employed for growing essentially any plant, such as vegetables, exotic flowering plants, or the like.

It should now be apparent to those skilled in the art that an improved hydroponic garden capable of achieving the stated objects of the invention has been provided. The combination of elements shown and described gives better trouble free operation of the hydroponic garden in practice. The circulation and mixture with air act to rejuvenate the solution. The fluid flows provided by the elements are arranged to prevent dead spots of unrejuvenated water solution in the garden. Convenience is enhanced in use of the garden in that additional nutrient may be dissolved in the water by adding it to enclosure 26 in concentrated form without endangering the plants growing in the garden. Because the plant roots are immersed in a constantly aerated and circulated aqueous nutrient solution, their environment is more constant and optimum than in prior art hydroponic systems. As a result, the plants grow faster than in both prior art hydroponic systems and conventional soil gardens.

It should further be apparent to those skilled in the art that various changes in form and details of the embodiment shown may be made. It is intended that such changes be included within the spirit and the scope of claims appended hereto.

What is claimed is:

1. An automatic, immersion hydroponic garden, which comprises:
    (a) a container for water and growing medium,
    (b) water and growing medium in said container to at least a predetermined level in said container,
    (c) a mixing chamber for air and the water in said container and having a water inlet proximate the bottom of said chamber, an air inlet and an outlet for the air and water in admixture proximate the top of said chamber, and below the predetermined level in the container,
    (d) a water inlet tube connected to the water inlet of said chamber, extending along the bottom of said container, and having a plurality of apertures into which water may flow, (e) means for supplying air to the air inlet of said mixing chamber, and (f) an air and water mixture dispersing enclosure surrounding said mixing chamber and having a plurality of apertures through which water and air from said mixing chamber may be dispersed below the predetermined level in the container into said water and growing medium container.

2. The automatic hydroponic garden of claim 1 in which said dispersing enclosure also contains growing medium and the outlet of said mixing chamber is positioned to discharge the air and water in admixture within the growing medium in said dispersing enclosure.

3. The automatic hydroponic garden of claim 2 containing relatively small, irregularly shaped, porous rocks as the growing medium.

4. An automatic immersion hydroponic garden, which comprises:

(a) a container for water, growing medium, and for plant roots immersed in the water, (b) water and relatively small, irregular shaped, porous rocks as the growing medium in said container to at least a predetermined level in said container, (c) means in said container also immersed in the water for mixing the water and air and supplying the mixture to said container without agitating the plant roots, (d) an air-water mixture dispersing enclosure surrounding said mixing means, said enclosure having a plurality of apertures, the apertures being located within the water below the predetermined level, said dispersing enclosure serving to separate the plant roots from said air-water mixing means, to receive the air-water mixture from said mixing means, and to disperse the air-water mixture to said container, (e) means for supplying air to said mixing means, and (f) means for recirculating water from said container to said mixing means without agitating the plant roots, said recirculating means comprising a water inlet tube having a plurality of apertures along the bottom of said container, flow of the air-water mixture out of said mixing means causing water to flow in the inlet tube.

5. The automatic hydroponic garden of claim 4 in which said enclosure also contains growing medium, and the air-water mixture passes through the growing medium from said mixing means to the apertures of said dispersing enclosure.

6. The automatic hydroponic garden of claim 5 in which the growing medium is relatively small, irregularly shaped, porous rocks.

7. A method for hydroponic gardening, which comprises:

substantially continually immersing roots of a plant in a body of aqueous nutrient solution containing a growing medium, separating a portion of the aqueous solution from the plant roots to a mixing chamber laterally disposed from the roots and submerged in the solution, by means of an inlet tube having a plurality of apertures disposed below the roots and having an end connected to the mixing chamber, constantly aerating the aqueous nutrient solution while separated from the plant roots in the mixing chamber, and without agitating the plant roots, constantly discharging the aerated aqueous nutrient solution from the mixing chamber to a dispersing enclosure which surrounds said mixing chamber in the body of solution and has a plurality of apertures opening into the body of solution which allow the aerated solution to circulate around the growing medium in a gentle, uniform flow that maintains the plant roots free of agitation.

8. The method of claim 7 in which the aqueous nutrient solution is aerated in an enclosure also immersed in the aqueous nutrient solution, but separate from the plant roots.

9. The method of claim 8 in which the growing medium comprises relatively small, irregularly shaped, porous rocks.

* * * * *